(12) United States Patent
Tsushima et al.

(10) Patent No.: US 12,446,562 B2
(45) Date of Patent: Oct. 21, 2025

(54) ONE-WAY CLUTCH AND FISHING REEL

(71) Applicant: GLOBERIDE, Inc., Tokyo (JP)

(72) Inventors: Daisuke Tsushima, Tokyo (JP); Hironori Horie, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 145 days.

(21) Appl. No.: 18/235,160

(22) Filed: Aug. 17, 2023

(65) Prior Publication Data

US 2024/0065244 A1    Feb. 29, 2024

(30) Foreign Application Priority Data

Aug. 29, 2022   (JP) .................... 2022-135549

(51) Int. Cl.
*A01K 89/01* (2006.01)
*A01K 89/033* (2006.01)

(52) U.S. Cl.
CPC .................. *A01K 89/05* (2015.05)

(58) Field of Classification Search
CPC .... A01K 89/011221; A01K 89/011223; A01K 89/0117; A01K 89/0186; A01K 89/05; A01K 89/053; F16D 41/067
See application file for complete search history.

(56) References Cited

U.S. PATENT DOCUMENTS

| | | | | |
|---|---|---|---|---|
| 5,570,851 A | * | 11/1996 | Yamaguchi | A01K 89/053 242/247 |
| 5,878,972 A | * | 3/1999 | Okada | A01K 89/033 242/247 |
| 6,003,799 A | * | 12/1999 | Jung | A01K 89/0117 242/301 |
| 7,721,987 B2 | * | 5/2010 | Hayashi | A01K 89/0117 242/295 |
| 2003/0146321 A1 | * | 8/2003 | Chang | A01K 89/011223 192/45.01 |
| 2009/0057461 A1 | * | 3/2009 | Hayashi | F16D 41/067 242/247 |
| 2016/0348740 A1 | * | 12/2016 | Kitayama | F16D 27/108 |

(Continued)

FOREIGN PATENT DOCUMENTS

| | | | | |
|---|---|---|---|---|
| CN | 101382171 A | | 3/2009 | |
| CN | 101382171 B | * | 8/2021 | ........... F16D 41/067 |
| DE | 60026665 T2 | * | 12/2006 | ............. A01K 89/01 |

(Continued)

OTHER PUBLICATIONS

Feb. 8, 2024 Extended European Search Report issued in Application No. 23183287.4.

(Continued)

*Primary Examiner* — Emmanuel M Marcelo
(74) *Attorney, Agent, or Firm* — Oliff PLC (57) ABSTRACT

A one-way clutch of the present disclosure comprises an inner ring, an outer ring, and a holder comprising a holding portion holding a biasing spring for biasing a plurality of rolling members. The holder comprises a first holder provided with the holding portion, and a second holder attached to the first holder so as to hold the outer ring in an axial direction. The first holder and the second holder are integrated by an engagement fixing portion provided on a radially inner side of an inner circumferential contour of the outer ring.

7 Claims, 9 Drawing Sheets

(56) References Cited

U.S. PATENT DOCUMENTS

2023/0309527 A1* 10/2023 Horie .............. A01K 89/01121
                                                            242/257

FOREIGN PATENT DOCUMENTS

| DE | 112020001330 T5 | * | 12/2021 | ........... F16D 41/067 |
|----|-----------------|---|---------|-------------------------|
| EP | 1457699 A2 | * | 9/2004 | ........... F16D 41/067 |
| EP | 4260696 A1 | | 10/2023 | |
| JP | H0624472 U | * | 4/1994 | ......... A01K 89/0117 |
| JP | H11210781 A | * | 8/1999 | .......... F16D 41/067 |
| JP | 2002-119182 A | | 4/2002 | |
| JP | 2010172272 A | | 8/2010 | |
| JP | 2017061965 A | * | 3/2017 | ............. F16D 15/00 |
| WO | WO-2010004896 A1 | * | 1/2010 | ........... F16D 41/067 |
| WO | 2011118500 A1 | | 9/2011 | |
| WO | WO-2015111639 A1 | * | 7/2015 | ............. F03D 15/00 |
| WO | WO-2019017320 A1 | * | 1/2019 | ............. F16D 41/06 |

OTHER PUBLICATIONS

Jun. 6, 2024 Office Action issued in Australian Patent Application No. 2023204084.
Jan. 16, 2025 Examination Report issued in Australian Patent Application No. 2023204084.
Sep. 25, 2024 Examination Report issued in Australian Patent Application No. 2023204084.
Feb. 16, 2024 Office Action issued in Taiwanese Patent Application No. 112129202.
Mar. 12, 2025 Office Action issued in European Patent Application No. 23183287.4.
Aug. 4, 2025 Office Action issued in European Patent Application No. 23183287.4.

* cited by examiner

ONE-WAY CLUTCH AND FISHING REEL

CROSS-REFERENCE TO RELATED APPLICATION

This application claims priority under 35 U.S.C. § 119 to Japanese Patent Application No. 2022-135549 filed on Aug. 29, 2022 in the Japanese Patent Office, the entire contents of each hereby incorporated by reference.

FIELD

The present disclosure relates to a one-way clutch that prevents reverse rotation of a drive shaft and a fishing reel that incorporates the one-way clutch.

BACKGROUND

Generally, a spinning reel, which is a fishing reel, incorporates a reverse rotation prevention mechanism that allows rotation of a rotor in a fishing line winding direction by a rotation operation of a handle and prevents reverse rotation of the rotor when the handle is to be reversely rotated. Normally, the reverse rotation prevention mechanism includes a one-way clutch including an inner ring fitted into a pinion gear to prevent rotation, a holder disposed radially outside the inner ring and holding a plurality of rolling members, and an outer ring disposed radially outside the holder and fixed to a reel body to prevent rotation.

For example, as disclosed in JP 2010-172272 A, it is known that the one-way clutch has an assembly structure in which the constituent members are integrated, and assembling to the reel body is performed using screwing (a screw seat is provided outside the outer ring and fixed to the reel body). In addition, the holder is formed into a plurality of structures (a first holder and a second holder) and integrated so that the constituent members such as the rolling member, the biasing spring, and the outer ring do not come off in the axial direction.

SUMMARY

As described above, in the one-way clutch incorporated in the conventional fishing reel, the holder is formed into a plurality of structures, but a configuration in which both sides are integrated is not sufficiently considered. Specifically, since the first holder and the second holder are engaged with each other on the radially outer side of the outer ring, the one-way clutch becomes large in the radial direction, and the reel body cannot be downsized. At that time, by using a structure that can be easily separated by light press fitting or the like, it is necessary to perform an operation of paying attention to scattering such as falling off of components at the time of manufacturing, assembling to the reel body, or maintenance. Furthermore, since the one-way clutch is screwed and fixed to the reel body radially outward, the reel body cannot be reduced in size and weight.

The present disclosure has been made in view of the above problems, and an object thereof is to provide a one-way clutch in which a reel body is reduced in size and weight and handling of constituent members is easy, and a fishing reel incorporating the one-way clutch.

In order to achieve the above object, a one-way clutch according to the present disclosure comprises an inner ring, an outer ring, and a holder comprising a holding portion holding a biasing spring for biasing a plurality of rolling members. The holder comprises a first holder provided with the holding portion, and a second holder attached to the first holder so as to hold the outer ring in an axial direction. The first holder and the second holder are integrated by an engagement fixing portion provided on a radially inner side of an inner circumferential contour of the outer ring.

According to the one-way clutch described above, the holder to be a constituent member comprises the first holder comprising the holding portion that holds the biasing spring for biasing the plurality of rolling members, and the second holder that is attached to the first holder so as to hold the outer ring in the axial direction. The first holder and the second holder are integrated by the engagement fixing portion provided on the radially inner side of the inner circumferential contour of the outer ring. That is, since the engagement fixing portion for integrating the first holder and the second holder does not protrude radially outward with respect to the outer ring, the one-way clutch can be reduced in size and weight.

Further, in order to achieve the above object, the present disclosure provides a fishing reel incorporating the one-way clutch having the above configuration. By incorporating the one-way clutch that is reduced in size and weight, the reel body can also be reduced in size and weight.

According to the present disclosure, it is possible to obtain a one-way clutch that can reduce the size and weight of a reel body and facilitate handling of constituent members, and it is possible to obtain a fishing reel reduced in size and weight by incorporating the one-way clutch into the reel body.

DETAILED DESCRIPTION

Figure 1:
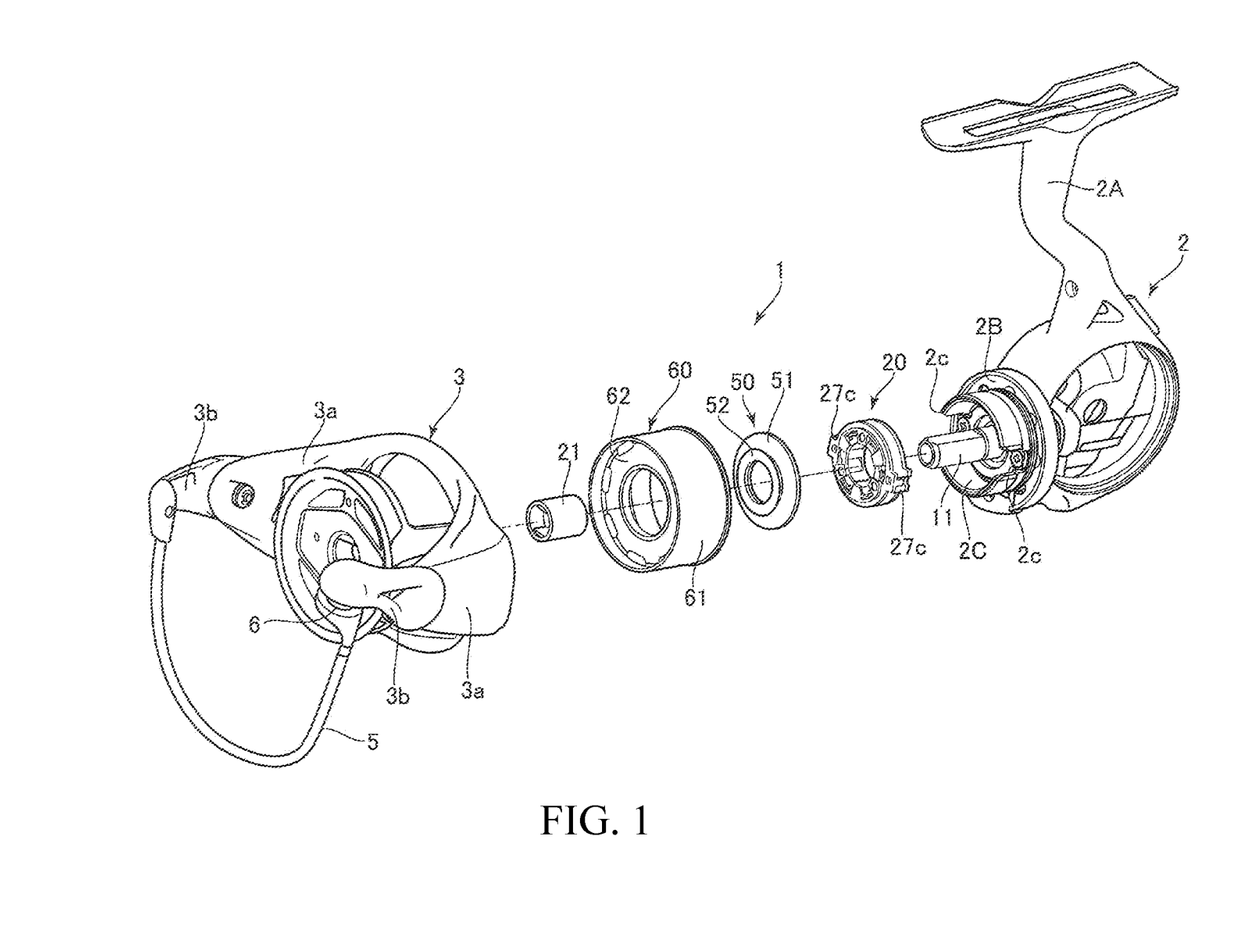
FIG. 1 is an exploded perspective view illustrating a first embodiment of a fishing reel (spinning reel) according to the present disclosure.
Figure 2:
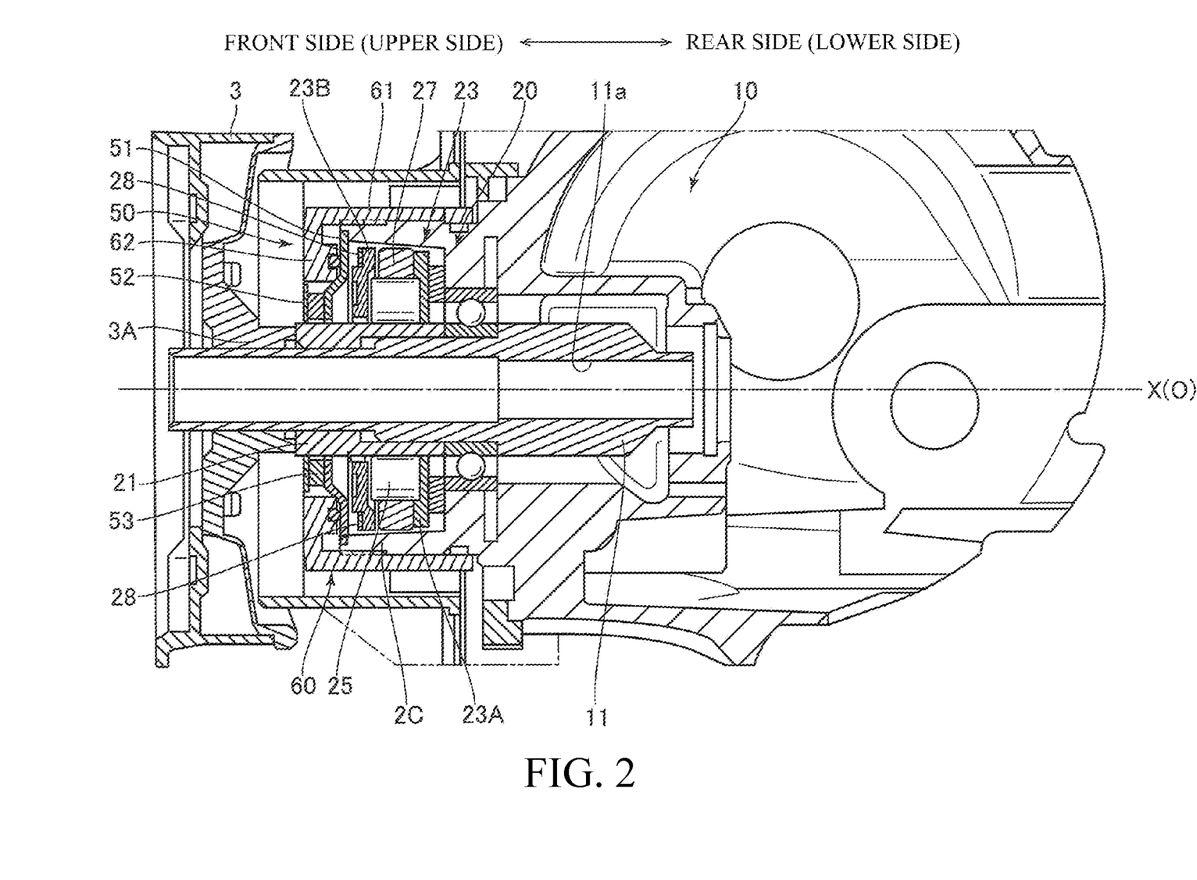
FIG. 2 is a view illustrating an internal configuration of the spinning reel illustrated in FIG. 1.

FIGS. 1 and 2 are views illustrating an embodiment of a spinning reel which is a fishing reel according to the present disclosure, in which FIG. 1 is an exploded perspective view, and FIG. 2 is a view illustrating an internal configuration.

In the following description of a one-way clutch, a direction on a spool side is defined as a front side (upper side), a direction on a reel body side is defined as a rear side (lower side), an axial direction X is defined as an axial direction of a spool shaft, and a center O is defined as an axial position of the spool shaft (see FIG. 2).

First, an outline of an overall configuration of the spinning reel of the present embodiment will be described.

A reel leg 2A to be mounted on a fishing rod is formed integrally with a reel body 2 of a spinning reel (hereinafter, referred to as the reel) 1. A rotor 3 that is rotatably supported and a known spool (not illustrated in the drawings) that is supported to be movable back and forth in synchronization with the rotational motion of the rotor 3 are disposed in front of the reel body 2.

The rotor 3 comprises a pair of arm portions 3*a* that rotates around the spool, and a bail support member 3*b* to which a base end of a bail 5 is attached is rotatably supported at a front end of each arm portion 3*a* between a fishing line winding position and a fishing line releasing position. In this case, one base end of the bail 5 is attached to a fishing line guide portion (line roller) 6 provided integrally with the bail support member 3*b*.

In the reel body 2, a handle shaft is rotatably supported via a bearing, and a handle is attached to a protrusion end of the handle shaft. The handle shaft is provided with a driving force transmission mechanism 10 that transmits a driving force to the rotor 3 to rotationally drive the rotor when the handle is rotationally operated.

As known, the driving force transmission mechanism 10 comprises a drive gear integrally rotatably mounted on the handle shaft, and a pinion 11 comprising a pinion tooth portion meshing with the drive gear. The pinion 11 extends in a front-rear direction orthogonal to the handle shaft, and has a function as a rotation drive shaft in which a cavity portion 11*a* extending in an axial direction is formed. In this case, the spool shaft that engages with a known oscillating mechanism moving the spool back and forth when the handle is rotationally operated is inserted through the cavity portion 11*a*, and the spool is mounted on a distal end thereof.

The pinion 11 is rotatably supported by the reel body 1. Further, the pinion 11 extends toward the spool side, and the rotor 3 is integrally rotatably attached to a distal end of the pinion 11. The rotor 3 is fixed by externally fitting a through-hole of a boss portion 3A formed at a center portion into the distal end of the pinion 11 and tightening a nut (not illustrated in the drawings). A one-way clutch 20 constituting a reverse rotation prevention mechanism is disposed on the pinion 11.

With the above configuration, when the handle is wound, the rotor 3 is rotationally driven via the driving force transmission mechanism 10, and the spool is reciprocated in the front-rear direction via the oscillating mechanism and the spool shaft. Therefore, the fishing line is evenly wound around the spool via the fishing line guide portion 6 of the rotationally driven rotor 3.

Next, the one-way clutch 20 of the present embodiment will be described with reference to FIGS. 3 to 8B in addition to FIGS. 1 and 2.

Figure 3:
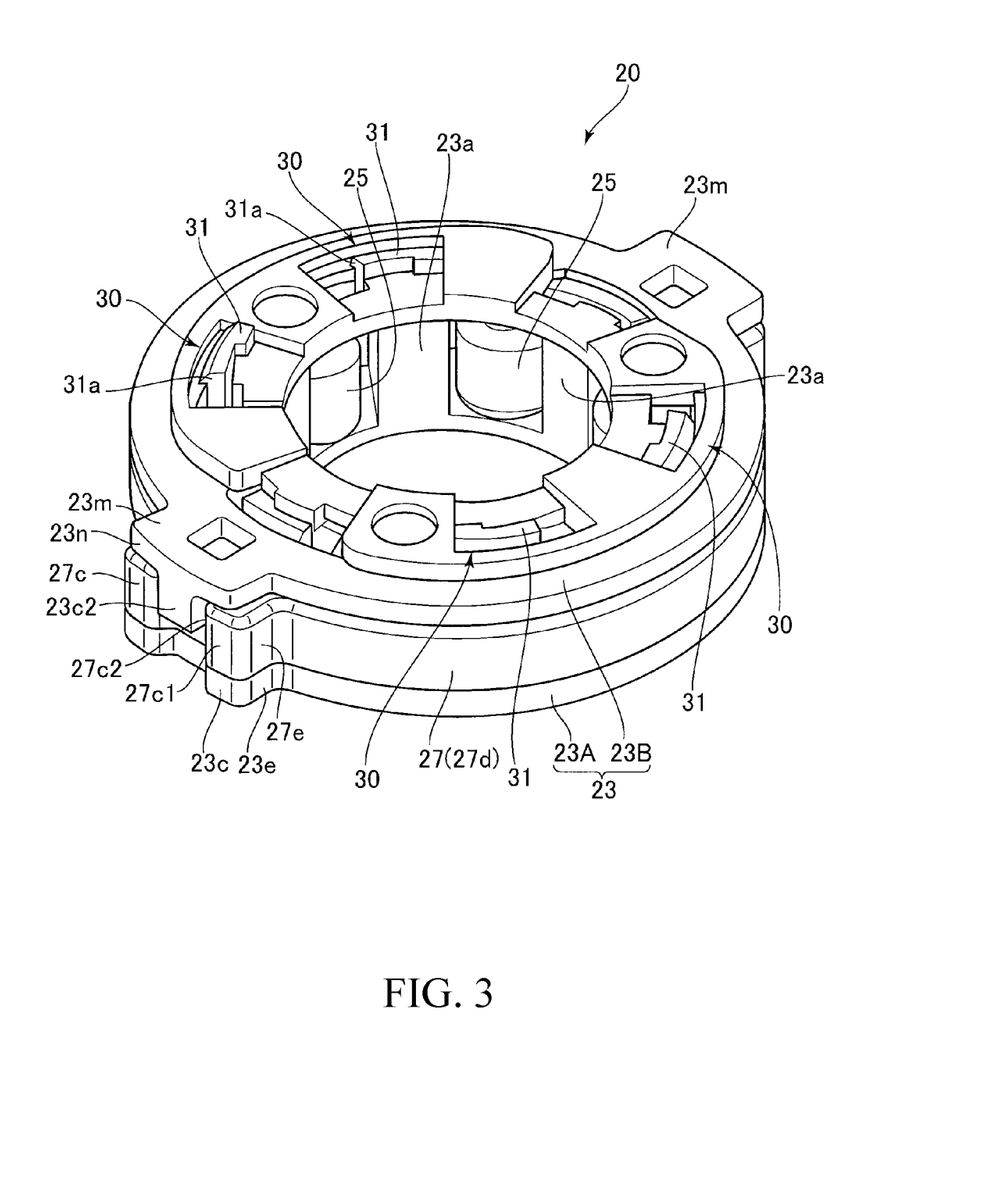
FIG. 3 is a perspective view of a one-way clutch incorporated in the fishing reel.
Figure 4:
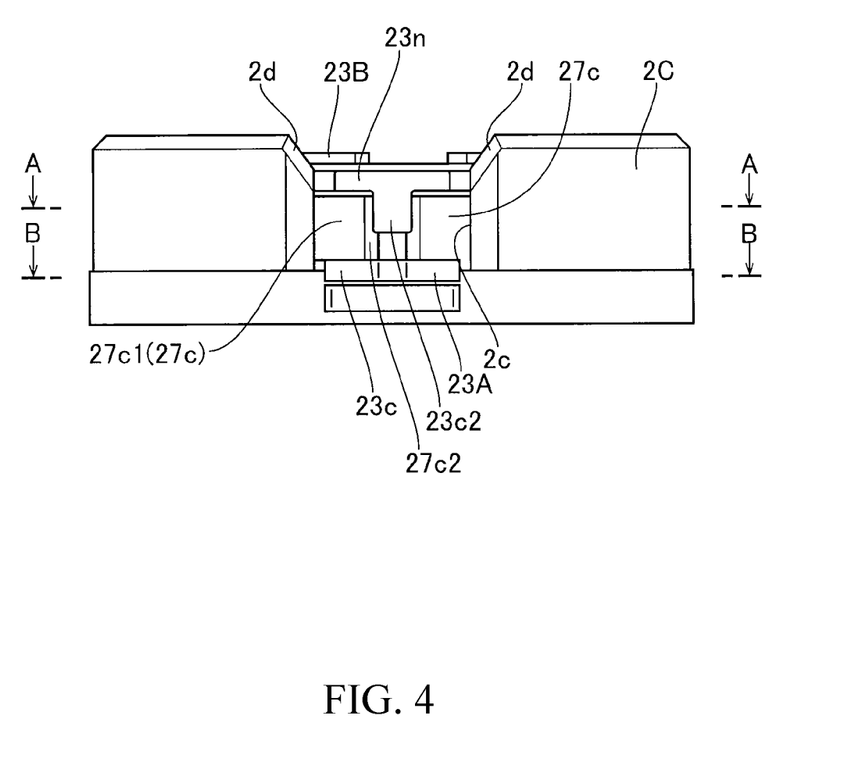
FIG. 4 is a side view of the one-way clutch illustrated in FIG. 3.
Figure 5:
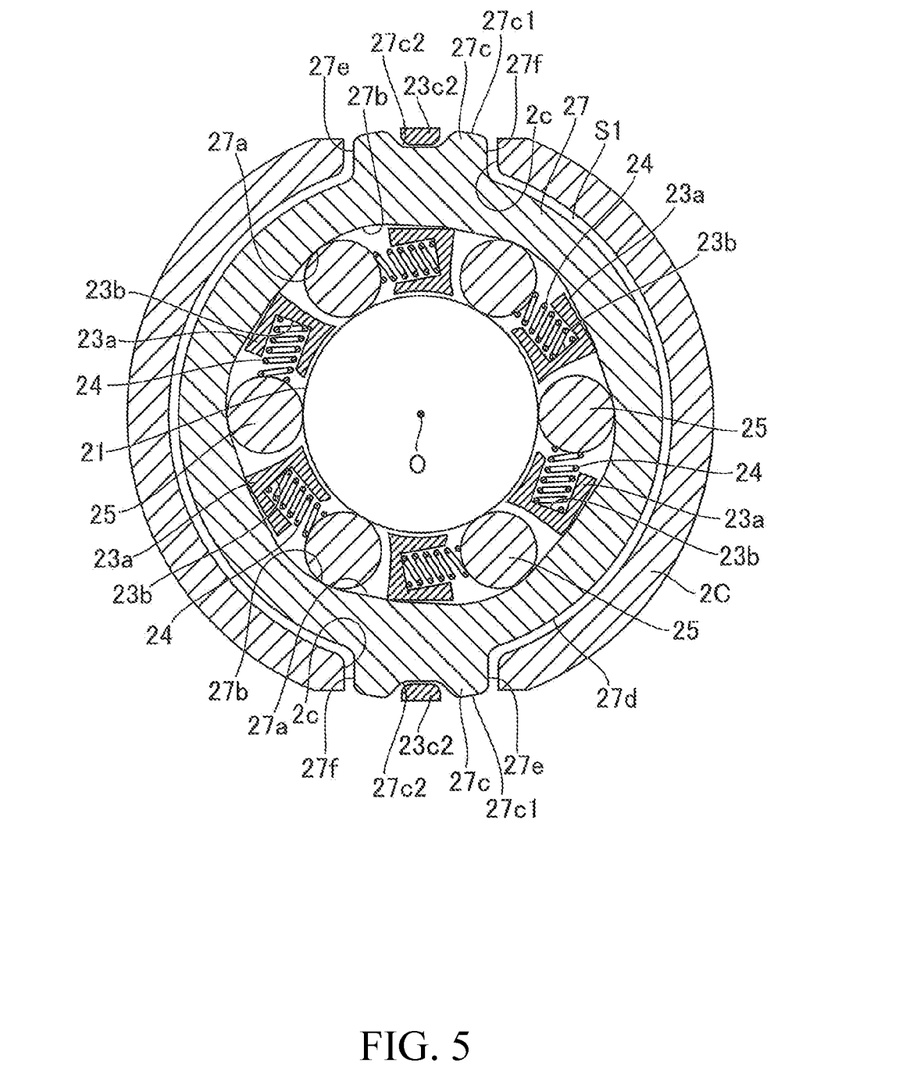
FIG. 5 is a cross-sectional view taken along the line A-A in FIG. 4.
Figure 6:
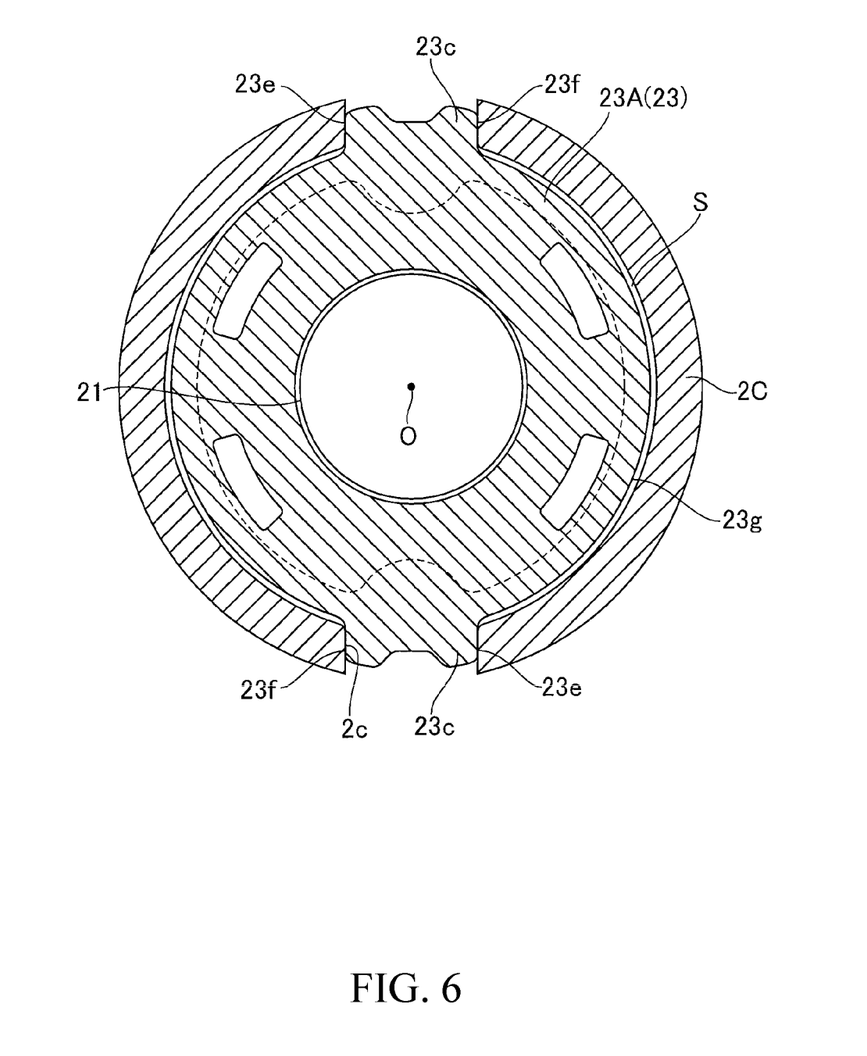
FIG. 6 is a cross-sectional view taken along the line B-B in FIG. 4.
Figure 7:
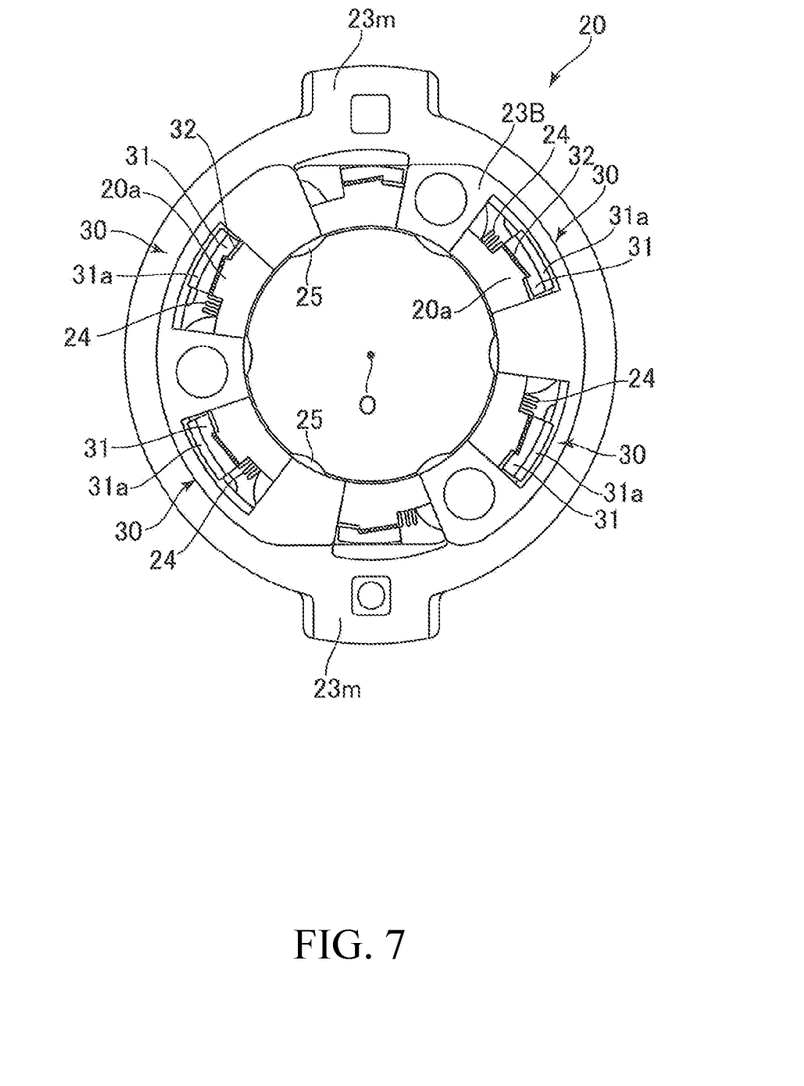
FIG. 7 is a plan view of the one-way clutch illustrated in FIG. 3.
Figure 8A:
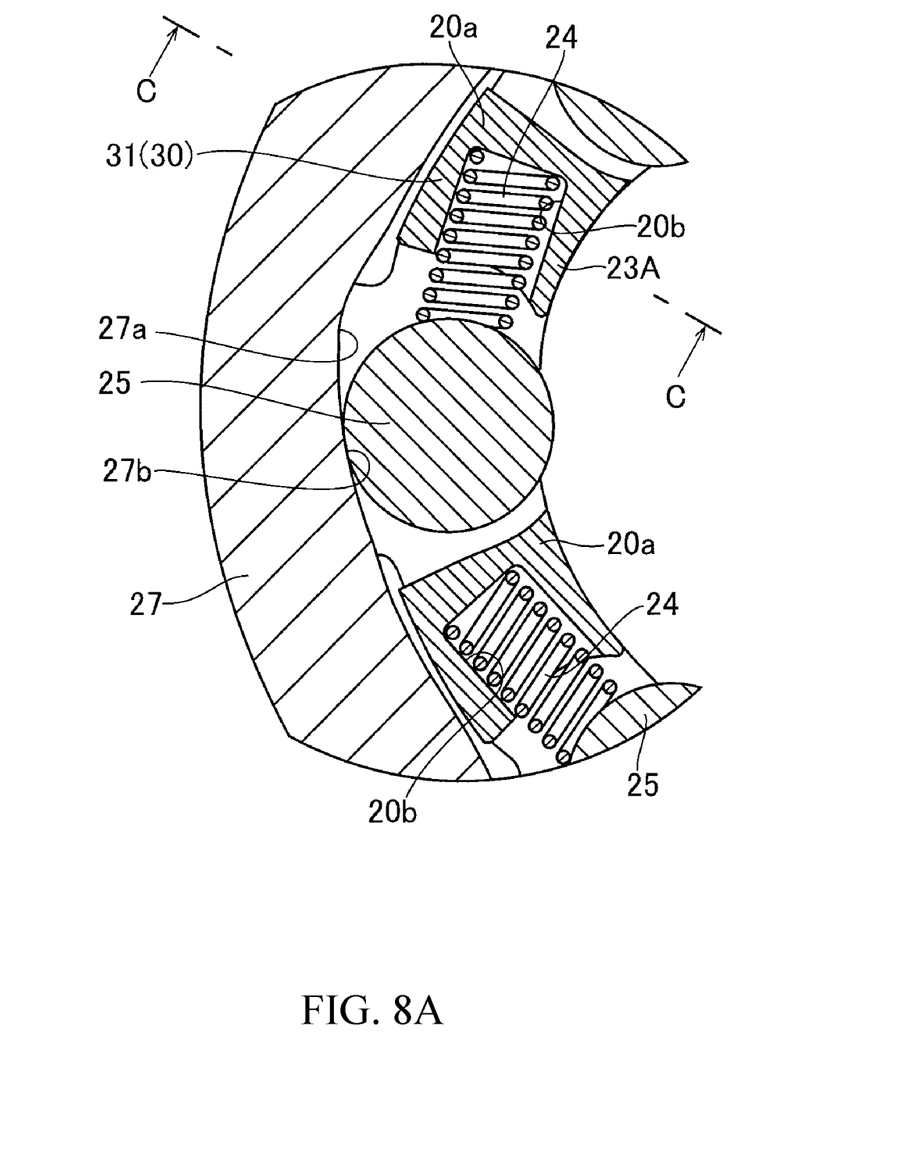
FIG. 8A is a view illustrating a configuration of a holding portion of a holder (first holder) of the one-way clutch.
Figure 8B:
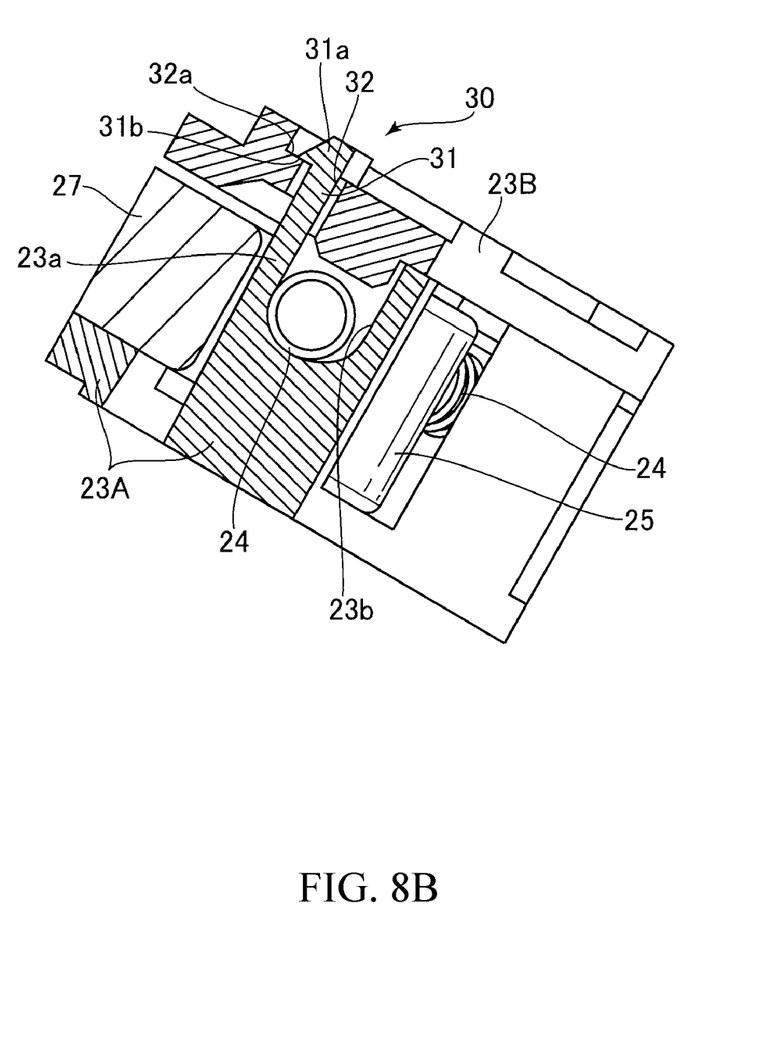
FIG. 8B is a cross-sectional view taken along the line C-C in FIG. 8A.

FIGS. 3 to 8B illustrate the one-way clutch having an assembly structure incorporated in the spinning reel illustrated in FIG. 1. FIG. 3 is a perspective view, FIG. 4 is a side view, FIG. 5 is a cross-sectional view taken along the line A-A in FIG. 4, FIG. 6 is a cross-sectional view taken along the line B-B in FIG. 4, FIG. 7 is a plan view of the one-way clutch illustrated in FIG. 3, FIG. 8A is a view illustrating a configuration of a holding portion of a holder (first holder) of the one-way clutch, and FIG. 8B is a cross-sectional view taken along the line C-C in FIG. 8A.

As illustrated in FIG. 1, a base portion 2B that is formed in a substantially disk shape is disposed on the spool side of the reel body 2, and a regulation portion that regulates the movement of the one-way clutch 20 in the rotation direction is provided on a surface portion of the base portion 2B. The regulation portion of the present embodiment is configured as a circumferential wall (cylindrical portion protruding in the axial direction) 2C provided on the reel body 2. The pinion 11 is rotatably supported through a center portion of the circumferential wall 2C, and the one-way clutch 20 is disposed in an intermediate portion thereof. In this case, notch portions 2*c* are formed in the circumferential wall 2C at 180° intervals such that a protrusion portion (stopper) of the one-way clutch 20 described later is disposed.

The pinion 11 is rotationally driven via the drive gear by a rotation operation of the handle. Further, the one-way clutch 20 is disposed in the intermediate portion of the pinion 11, has a function of allowing the rotation of the pinion 11 in the fishing line winding direction and preventing the reverse rotation, and has an inner ring 21, an outer ring 27, and a holder 23 comprising a holding portion 23*a* holding a biasing spring 24 for biasing a plurality of rolling members 25. The holder 23 comprises a first holder 23A comprising the holding portion 23*a* and a second holder 23B attached to the first holder 23A so as to hold the outer ring 27 in the axial direction. These constituent members are assembled (assembly structure in which a plurality of constituent members are integrated; also referred to as ASSY), and can be handled integrally.

By configuring the holder 23 with a plurality of members (the first holder 23A and the second holder 23B) as described above, the constituent members comprising the outer ring and the like are suppressed from coming off in the axial direction and assembling is facilitated.

The inner ring 21 is prevented from rotating with respect to the pinion 11, and has a function as a drive shaft that rotates integrally with the pinion 11. Specifically, a cross section of the pinion 11 has a shape in which a non-circular portion is partially formed, and the inner ring 21 is rotatable integrally with the pinion 11 by fitting the non-circular portion of the inner ring 21 into this portion.

The holder 23 is disposed radially outside the inner ring 21, and is configured by integrating the first holder 23A and the second holder 23B as described above. In the present embodiment, the first holder 23A is disposed on the lower side, and the second holder 23B is disposed on the upper side. The first holder 23A and the second holder 23B are integrally assembled so as to hold the outer ring 27. Note that the first holder 23A may be defined as the upper side, and the second holder 23B may be defined as the lower side.

The first holder 23A and the second holder 23B described above are integrated by an engagement fixing portion 30 to be described later. The engagement fixing portion 30 is disposed on the inner side of an inner circumferential contour of the outer ring 27 in which a wedge region 27*a* and a free region 27*b* are formed, and the first holder 23A and the second holder 23B are engaged and fixed at this inner position.

The first holder 23A is provided with the holding portions 23*a* disposed at regular intervals in the circumferential direction. Each holding portion 23*a* is provided with a recess 23*b* that is opened (opened in a counterclockwise direction as illustrated in FIG. 5) in the circumferential direction, and the biasing spring 24 is held in each recess 23*b*. The rolling members 25 are disposed between the respective holding portions, and each rolling member 25 is biased in the circumferential direction (counterclockwise direction; reverse rotation direction in FIG. 5) by the biasing spring 24.

The outer ring 27 is disposed radially outside each rolling member 25 and is formed in a ring shape (or a substantially ring shape) (see FIG. 5). On an inner circumferential surface of the outer ring 27, a wedge region 27*a* for preventing the rotation of each rolling member 25 and a free region 27*b* for freely rotating the rolling member 25 are connected and formed. Each rolling member 25 held by the holder 23 (first holder 23A) is constantly biased toward the wedge region by the biasing spring 24. An outer circumferential surface 27d of the outer ring 27 is formed in a circular shape (including a substantially circular shape).

A protrusion portion 27c is provided on a part of the outer ring 27 formed in the substantially ring shape so as to protrude radially outward. The protrusion portion has a function as a stopper that regulates the rotation of the outer ring 27 (hereinafter, also referred to as the stopper 27c). The stopper 27c is integrally formed so as to protrude radially outward from the outer circumferential surface 27d of the outer ring 27, and is provided at one or more places. In this case, there is a possibility that a large torque is applied to the outer ring, and stress concentrates at one place to cause a deviation or the like. Therefore, it is preferable to form two or more stoppers at equal intervals. In the present embodiment, two stoppers are provided so as to face each other with the axis (center O) therebetween at 180° intervals. Each stopper 27c has a constant width in the circumferential direction, and both sides 27e and 27f in the circumferential direction have a rotation prevention function.

As illustrated in FIG. 6, the first holder 23A has a shape similar to that of the outer ring 27, and preferably, a protrusion portion 23c having substantially the same shape is integrally formed at the same position (position overlapping in the axial direction) as the stopper 27c of the outer ring 27. Similarly to the outer ring, the two protrusion portions 23c are provided so as to face each other with the axis (center O) therebetween at an interval of 180°, and have a function as the stoppers (hereinafter, also referred to as the stoppers 23c). The stopper 23c has a constant width in the circumferential direction, and both sides 23e and 23f in the circumferential direction have a rotation prevention function.

The circumferential wall 2C protruding from the reel body 2 is provided with the notch portion 2c penetrating the circumferential wall in the radial direction. The notch portion 2c is formed to such an extent that the stopper 23c of the first holder 23A and the stopper 27c of the outer ring 27 can be disposed, and by fitting each of the stoppers 23c and 27c into the notch portion 2c and disposing the second holder 23B from the surface thereof, the one-way clutch is rotation-prevented and fixed, and the coming-off of the outer ring is regulated (the movement in the circumferential direction and the axial direction is regulated).

Although one or more notch portions 2c may be formed in the circumferential wall 2C, in the present embodiment, two notch portions 2c are formed at equal intervals in the circumferential direction (two notch portions symmetrical with respect to the center O at 180° intervals) so as to be the same number of notch portions as the number of stoppers formed in the first holder 23A and the outer ring 27. As described above, by providing two or more notch portions 2c to be the same number of notch portions as the number of stoppers formed in the first holder 23A and the outer ring 27, it is possible to stably hold the one-way clutch without rattling.

The outer circumferential surfaces of the stoppers 23c and 27c are exposed in the radial direction at the notch portion 2c of the circumferential wall 2C, and can be pinched with fingers. Therefore, the first holder 23A and the outer ring 27 can be easily gripped integrally by each exposed stopper, and the attachment/detachment workability of the one-way clutch 20 can be improved. In this case, a chamfered portion 2d is preferably formed on the opening side (upper end side) of the notch portion 2c so as to gradually spread as it shifts upward (see FIG. 4). By forming the chamfered portion 2d, it is easy to perform the attachment/detachment operation of the first holder 23A and the outer ring 27.

In the above configuration, it is preferable that the stopper 23c of the first holder 23A and the notch portion 2c are configured to be in contact with each other without a gap (in contact with each other in a state where there is no play) as illustrated in FIG. 6. According to such a fitting relation, a relative position of the rolling member 25 mounted on the first holder 23A with respect to the reel body is fixed, a braking speed is not lowered (it does not take time to perform braking), and quick lock performance can be maintained.

That is, when there is play between both sides, in a state where the inner ring 21 rotates in the fishing line winding direction, the first holder 23A holding the biasing spring 24 also receives a corotation action by the inner ring, and the biasing spring 24 moves in the circumferential direction (in FIG. 5, the biasing spring 24 rotates together with the first holder in the clockwise direction by the play). If a load is applied to the reverse rotation side in this state, a time for moving each rolling member 25 to the wedge region 27a of the outer ring 27 is extended by the play, so that it takes time to brake, and quick lock performance cannot be exhibited. On the other hand, as illustrated in FIG. 6, by bringing the stopper 23c of the first holder 23A and the notch portion 2c into a fitting state without a gap, a fixed position of the biasing spring 24 can be maintained, and it is possible to exhibit quick lock performance at the time of reverse rotation without taking time until the operation due to the play.

Note that a gap S may be formed between an outer circumferential surface 23g of the first holder 23A and the circumferential wall 2C to such an extent that tolerance of the first holder 23A can be absorbed.

In addition, as illustrated in FIG. 5, the outer ring 27 is preferably configured to have some play S1 between the stopper 27c and the notch portion 2c and between the outer circumferential surface of the outer ring 27 and the inner circumferential surface of the circumferential wall 2C. With such a configuration, even if some tolerance is generated between the outer ring 27 and the circumferential wall 2C and the concentricity is deviated with respect to the center O, the deviation can be absorbed. As a result, backlash can be prevented while smooth rotation performance is secured, and the attachment/detachment operation can be easily performed. In addition, by configuring the outer ring 27 to be fitted into the circumferential wall 2C so that the outer ring and the circumferential wall are in a non-contact state (play S1 occurs), when the inner ring 21 is centered, a non-contact state can be maintained between the outer ring 27 and the circumferential wall 2C, and conduction between both members can be prevented (electrolytic corrosion is prevented).

Note that an electrolytic corrosion prevention plate may be interposed between both members.

Next, the configuration of the engagement fixing portion 30 that integrates the first holder 23A and the second holder 23B will be described with reference to FIGS. 7 to 8B. As described above, the engagement fixing portion 30 is disposed on the inner side of the inner circumferential contour of the outer ring 27 in which the wedge region 27a and the free region 27b are formed.

For example, the engagement fixing portion 30 can be configured by forming a displaceable convex portion protruding in the axial direction at a predetermined interval in the circumferential direction in the first holder 23A and forming a concave portion into which the convex portion is fitted at a corresponding position of the second holder 23B.

In this configuration, the first holder 23A and the second holder 23B can be integrated by moving the second holder 23B in the axial direction so as to hold the outer ring 27 and engaging the convex portion with the concave portion.

Specifically, in the present embodiment, as illustrated in FIG. 8B, the convex portion is configured by a displacement portion (protrusion piece) 31 that is elastically displaced and comprises a locking claw 31a at the distal end, and the concave portion is configured by a retaining portion 32 that retains the locking claw 31a of the displacement portion 31. In this case, the retaining portion 32 is configured as a fitting hole through which the locking claw 31a on the distal end side of the displacement portion 31 passes, and both sides are easily assembled (the displacement portion 31 and the retaining portion 32 are easily aligned). That is, when the fitting hole of the second holder 23B is aligned with the displacement portion 31 and the second holder 23B is moved in the axial direction to overlap the first holder 23A, the locking claw portion is elastically displaced (displaced radially inward). When the locking claw 31a passes through the retaining portion 32, the locking claw portion returns to the original position, and a back flat portion 31b of the locking claw 31a and a flat portion 32a around the retaining portion 32 are engaged with each other to be retained.

As described above, when the first holder 23A, the outer ring 27, and the second holder 23B are assembled, the one-way clutch can be easily assembled by a simple operation of simply aligning the second holder 23B with the first holder 23A and moving the second holder in the axial direction.

In the above configuration, it is preferable that the displacement portion 31 is integrally formed with the holding portion 23a of the first holder 23A. In the present embodiment, since the stopper 23c of the first holder 23A and the notch portion 2c are in the fitting state without a gap as illustrated in FIG. 6, the biasing spring 24 is always located at a stable position, and quick lock performance can be exhibited at the time of reverse rotation.

In the engagement fixing portion 30 described above, the displacement portion 31 is elastically deformed, and the back flat portion 31b of the locking claw 31a and the flat portion 32a around the retaining portion 32 are fixed together, so that the attachment/detachment operation of the first holder 23A and the second holder 23B can be easily performed.

Further, it is preferable that a plurality of engagement fixing portions 30 are provided in the first holder 23A and the second holder 23B. In the present embodiment, as illustrated in FIG. 7, the engagement fixing portions are formed at four positions substantially symmetrically with respect to a diameter of the one-way clutch, so that the first holder 23A and the second holder 23B are not displaced in the circumferential direction, and a stable fixed state can be obtained.

In the engagement fixing portion 30 of the present embodiment, the first holder 23A and the second holder 23B are configured to be attachable and detachable, but both members may be integrally fixed by welding, caulking, or screwing. As described above, by fixing both the members, the fixed state is strengthened, and a removal load that sufficiently resists the impact can be secured.

In the above configuration, it is preferable to provide a positioning portion for positioning the outer ring 27 and the second holder 23B between the outer ring 27 and the second holder 23B. By providing the positioning portion, when the first holder 23A and the second holder 23B are integrated by the engagement fixing portion 30, a positional relation between them is maintained, and it is possible to easily incorporate the one-way clutch in which the above-described constituent members are assembled into the reel body. That is, since positioning is performed in a state where the stopper 23c of the first holder 23A and the stopper 27c of the outer ring 27 are aligned, handling is facilitated, and assembling to the notch portion 2c of the circumferential wall 2C is facilitated.

The positioning portion may fix the position between the outer ring 27 and the holder 23. For example, as illustrated in FIGS. 3 to 5, the positioning portion of the present embodiment comprises a recess 27c2 formed in an outer circumferential surface 27c1 of the stopper 27c of the outer ring 27, and a projection portion 23c2 formed in the second holder 23B and fitted into the recess 27c2. In this case, the second holder 23B is provided with a pair of protrusion pieces 23m protruding in the radial direction at positions overlapping the above-described stoppers 23c and 27c, and the projection portion 23c2 is formed to hang down on an outer circumferential surface 23n of the protrusion piece 23m.

By disposing the positioning portion described above, the first holder 23A, the outer ring 27, and the second holder 23B formed in a disk shape are overlapped, and the protrusion piece 23m of the second holder 23B can be easily aligned with the stopper 23c of the first holder 23A and the stopper 27c of the outer ring 27 protruding in the radial direction. Therefore, by covering the outer ring 27 with the second holder 23B along the axial direction, the projection portion 23c2 is fitted into the recess 27c2 to perform positioning, fixing is performed by the engagement fixing portion 30, and assembling can be easily performed.

In the one-way clutch described above, a diameter of the circumferential wall 2C (a diameter of the outer circumferential surface of the circumferential wall) and an outermost diameter of the outer ring 27 (a diameter of the outer circumferential surface 27c1 on the exposed side of the stopper 27c) are preferably the same. As a result, it is possible to downsize the portion where the one-way clutch is disposed.

According to the fishing reel incorporating the one-way clutch 20 having the above-described configuration, rotation (reverse rotation) of the handle (rotor 3) in a fishing line feeding direction is prevented.

That is, when the pinion is rotationally driven by rotationally operating the handle in a fishing line winding direction (rotationally driven in the clockwise direction in FIG. 5), the inner ring 21 also rotates in the same direction together with the pinion. At this time, since the rolling member 25 held by the holder 23 (first holder 23A) moves to the free region 27b of the outer ring 27, the rotational force of the inner ring 21 is not transmitted to the outer ring 27, and the rotor 3 can rotate together with the pinion 11 without any problem.

On the other hand, when the inner ring 21 tries to rotate in the reverse direction (the rotor 3 rotates in the fishing line feeding direction) together with the pinion, the rolling member 25 held by the holder 23 (first holder 23A) rolls in the counterclockwise direction and is located in the wedge region 27a of the outer ring 27 by the biasing spring 24, so that the rotational force of the inner ring 21 is transmitted to the outer ring 27. In this case, since the rotation of the outer ring 27 is regulated by the stopper 27c, reverse rotation of the pinion and the rotor 3 is prevented.

In the one-way clutch 20 having the above-described configuration, since the components are held (the first holder 23A and the second holder 23B are fixed) on the radially inner side of the inner circumferential contour of the outer ring 27, the one-way clutch can be downsized. Therefore, in the fishing reel incorporating the one-way clutch, the reel body can be reduced in size and weight, and the usability at the time of actual fishing can be improved. In this case, since the first holder and the second holder can be integrated only by moving relatively in the axial direction by the engagement fixing portion 30 having the above-described structure, assembling can be easily performed. In particular, as illustrated in FIG. 6, the first holder 23A is in a rotation-prevented and fixed state without a gap, and the first holder 23A and the second holder 23B are fixed by the holding portion 23a holding the biasing spring 24. Therefore, it does not take time to brake during the reverse rotation, and quick lock performance can be exhibited.

Further, in the present embodiment, the first holder 23A and the outer ring 27 are respectively provided with the stoppers so as to protrude radially outward, and the stopper is fitted into the regulation portion provided in the reel body to regulate the movement in the rotation direction. Therefore, it is not necessary to perform screwing to the reel body as in the conventional case, and it is possible to reduce the size and weight of the entire reel. In particular, the regulation portion is formed of the notch portion 2c of the circumferential wall 2C provided in the reel body, and the respective stoppers 23c and 27c of the first holder 23A and the outer ring 27 are disposed in the notch portion 2c (preferably, disposed at two or more positions), so that the load applied in the reverse rotation direction can be effectively received.

After the one-way clutch 20 is incorporated in the reel body, as illustrated in FIGS. 1 and 2, a magnetic seal mechanism 50 may be disposed so as to enhance waterproof and dust-proof effects on the one-way clutch 20.

As known, the magnetic seal mechanism 50 comprises ring-shaped magnetic plates (electrode plates) 51 and 52 disposed with a minute gap between the magnetic plates and the outer circumferential surface of the drive shaft (inner ring 21), and a ring-shaped magnet 53 held between the magnetic plates, and has a configuration in which the gap between the drive shaft and the magnetic plate is filled with a magnetic fluid.

In the present embodiment, a waterproof cap 60 is provided on the reel body so as to wrap the circumferential wall 2C and the one-way clutch 20. The waterproof cap 60 comprises a shape including a cylindrical portion 61 surrounding the one-way clutch 20 and a cover portion 62 closing an opening on the spool side, and the magnetic plate 51 of the magnetic seal mechanism 50 is in close contact with an inner surface of the cover portion 62.

As described above, the magnetic seal mechanism 50 is disposed on the spool side of the one-way clutch 20, and the waterproof cap 60 is provided so as to wrap the circumferential wall 2C and the one-way clutch 20, so that it is possible to prevent entry of a foreign material such as moisture or dust into the one-way clutch 20 and to enhance durability.

The embodiments according to the present disclosure have been described above, but the present disclosure is not limited to the embodiments and may be modified in various ways.

In the engagement fixing portion 30, the displacement portion 31 may be formed on the side of the second holder 23B, and the retaining portion 32 may be formed on the side of the first holder 23A. In addition, a method of engaging and fixing for integration is not particularly limited, and for example, a structure in which the first holder 23A and the second holder 23B are relatively rotated to lock the first holder and the second holder may be used. In addition, the engagement fixing portion 30 may have a configuration in which all the components are not positioned on the radially inner side of the inner circumferential contour of the outer ring. That is, some components may be disposed at positions overlapping the outer ring.

The present disclosure is not particularly limited with respect to the configuration other than the engagement fixing portion 30 described above, and for example, the configuration of the stopper and the regulation portion preventing rotation of the one-way clutch can be appropriately modified.

Although the one-way clutch of the above-described embodiment prevents the reverse rotation of the rotor by fixing the holder 23, the one-way clutch may have a structure in which an operation member protruding to the outside of the reel body is provided, the rolling member is located in the free region by rotating the holder by the operation of the operation member, and the reverse rotation of the rotor is allowed. A regulation plate (not illustrated in the drawings) may be separately disposed adjacent to the one-way clutch 20 so as to regulate the movement of the one-way clutch 20 in the axial direction.

In the present embodiment, the spinning reel is exemplified as the fishing reel, but the one-way clutch 20 assembled as described above can also be applied to other reels (double bearing reels and the like) in which the one-way clutch can be incorporated.

REFERENCE SIGNS LIST 1 spinning reel (fishing reel)
2 reel body
2C circumferential wall (regulation portion)
2c notch portion
3 rotor
20 one-way clutch
23 holder
23A first holder
23B second holder
23c stopper
27 outer ring
27c stopper
30 engagement fixing portion

What is claimed is:

1. A one-way clutch comprising an inner ring, an outer ring, and a holder comprising a holding portion holding a biasing spring for biasing a plurality of rolling members, wherein
the holder comprises a first holder provided with the holding portion, and a second holder attached to the first holder so as to hold the outer ring in an axial direction,
the first holder and the second holder are integrated by an engagement fixing portion provided on a radially inner side of an inner circumferential contour of the outer ring, and
the engagement fixing portion has a displacement portion that is elastically displaced when the first holder and the second holder are moved relatively in the axial direction and comprises a locking claw, and a retaining portion that retains the locking claw of the displacement portion.

2. The one-way clutch according to claim 1, wherein
the displacement portion is formed integrally with the holding portion of the first holder, and the retaining portion is a fitting hole which is formed in the second holder and to which the locking claw of the displacement portion is locked.

3. The one-way clutch according to claim 1, wherein a plurality of engagement fixing portions are provided in the first holder and the second holder.

4. The one-way clutch according to claim 1, wherein the engagement fixing portion integrally fixes the first holder and the second holder by welding, caulking, or screwing.

5. A fishing reel incorporating a one-way clutch that allows rotation of a rotation drive shaft supported in a reel body in one direction and prevents rotation in the other direction, wherein the one-way clutch comprises an inner ring, an outer ring, and a holder comprising a holding portion holding a biasing spring for biasing a plurality of rolling members, the holder comprises a first holder provided with the holding portion, and a second holder attached to the first holder so as to hold the outer ring in the axial direction, the first holder and the second holder are integrated by an engagement fixing portion provided on a radially inner side of an inner circumferential contour of the outer ring, and the engagement fixing portion has a displacement portion that is elastically displaced when the first holder and the second holder are moved relatively in the axial direction and comprises a locking claw, and a retaining portion that retains the locking claw of the displacement portion.

6. The fishing reel according to claim 5, wherein the reel body is provided with a regulation portion that is fixed so as to regulate the movement of the one-way clutch in a rotation direction, the first holder and the outer ring are respectively provided with stoppers that protrude radially outward, and the movement of the one-way clutch in the rotation direction is regulated by the regulation portion provided on the reel body and each stopper.

7. The fishing reel according to claim 6, wherein the regulation portion is a notch portion which is formed along a circumferential direction on a circumferential wall provided in the reel body and in which the stopper is disposed.

* * * * *